United States Patent

Dugan

Patent Number: 5,150,999
Date of Patent: Sep. 29, 1992

[54] BALE LIFTER AND MOVER

[76] Inventor: Joe W. Dugan, Ballerina Cir., Box 87-A, Grove, Okla. 74344

[21] Appl. No.: 597,486

[22] Filed: Oct. 9, 1990

[51] Int. Cl.⁵ .............................................. B66F 9/18
[52] U.S. Cl. .................... 414/24.5; 414/703; 414/704; 414/706; 414/713; 414/715; 414/917; 414/920
[58] Field of Search ............ 414/24.5, 24.6, 917, 414/920, 721, 697, 707, 710, 711, 703, 704, 706, 712, 713, 715; 294/120, 126, 128

[56] References Cited

U.S. PATENT DOCUMENTS

| | | | |
|---|---|---|---|
| 3,934,726 | 1/1976 | Martin | 414/24.5 |
| 4,099,629 | 7/1978 | Cox | 414/24.5 |
| 4,120,405 | 10/1978 | Jones et al. | 414/24.5 |
| 4,256,426 | 3/1981 | Buss | 414/24.5 |
| 4,288,191 | 9/1981 | Lynch | 414/24.5 |
| 4,299,522 | 11/1981 | Barton et al. | 414/24.5 |
| 4,514,127 | 4/1985 | Maier | 414/24.6 |
| 4,674,786 | 6/1987 | Lynch | 414/24.5 X |
| 4,822,237 | 4/1989 | Meyer et al. | 414/917 X |

FOREIGN PATENT DOCUMENTS

| | | | |
|---|---|---|---|
| 2511125 | 9/1976 | Fed. Rep. of Germany | 414/24.5 |
| 1548029 | 7/1979 | United Kingdom | 414/24.5 |
| 2158804 | 11/1985 | United Kingdom | 414/920 |
| 2204557 | 11/1988 | United Kingdom | 414/24.5 |

Primary Examiner—Robert J. Spar
Assistant Examiner—Janice Krizek
Attorney, Agent, or Firm—William S. Dorman

[57] ABSTRACT

Apparatus for lifting round bales of hay including a pair of arms which project forwardly from the front end of a tractor. These arms support a pivotal structure which includes a spear for impaling a round bale of hay and thereafter tilting the bale up off the ground. Another embodiment includes a device similarly attached to the forward end of a tractor; however, the latter embodiment involves a spear which can be elevated with respect to the ground while remaining parallel to the ground. A third embodiment involves a bale lifting device which is similar to the second embodiment but which can be attached to a conventional 3-point hitch on a tractor or to the rear of a flatbed trailer. A still further embodiment includes a square frame supported from a tractor by means of a 3-point hitch connection. The square frame rotatably supports an elongated rectangular frame which has impaling spears at the opposite ends thereof. In operation, the farmer will drive the tractor to impale a first bale of hay on the spear at one end of the rectangular frame, thereafter he will lift and pivot the frame so that the spear at the opposite end will now be disposed to pick up a second bale. After picking up the second bale, the rectangular frame will be moved to a horizontal position with both bales being off the ground.

6 Claims, 10 Drawing Sheets

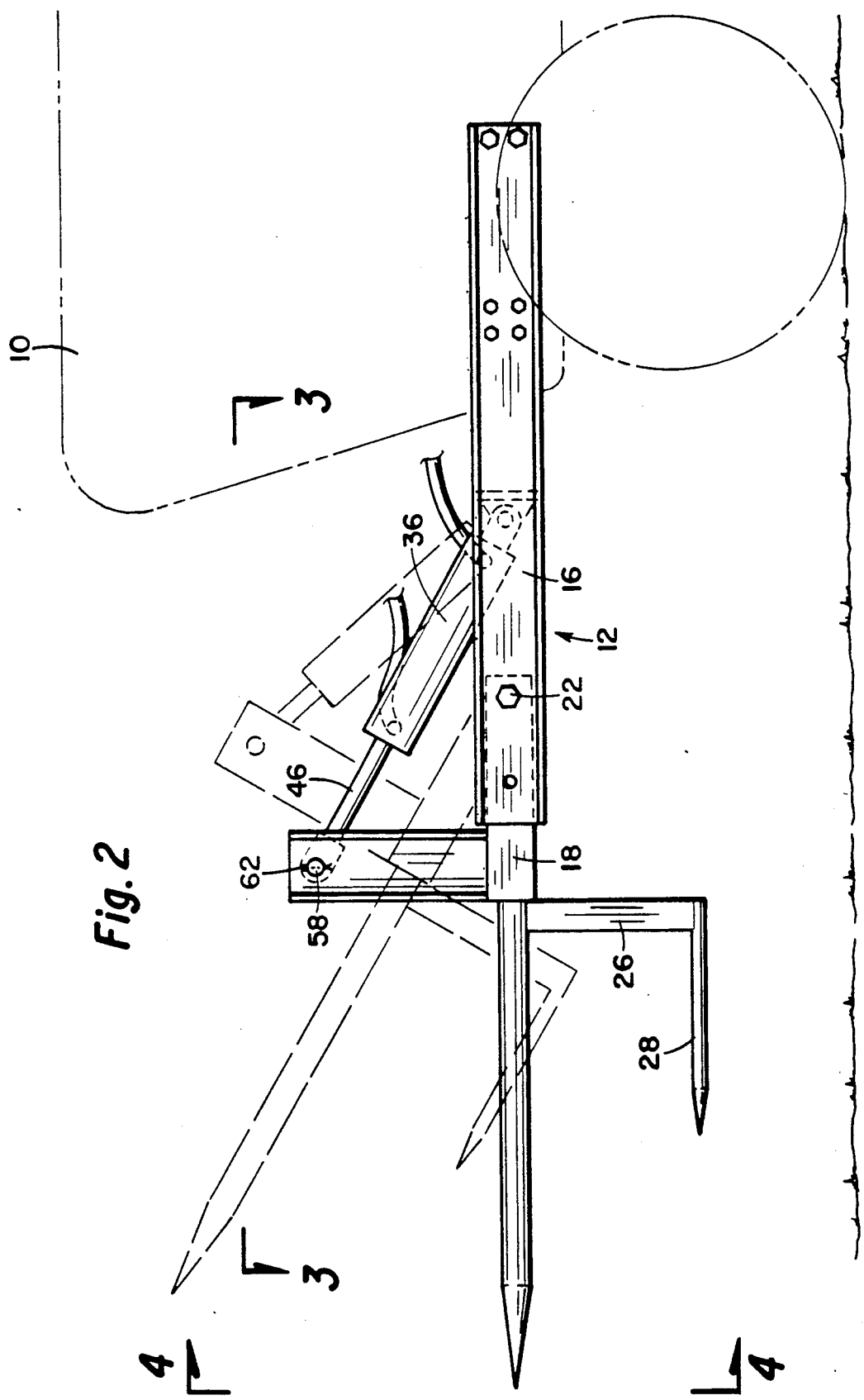

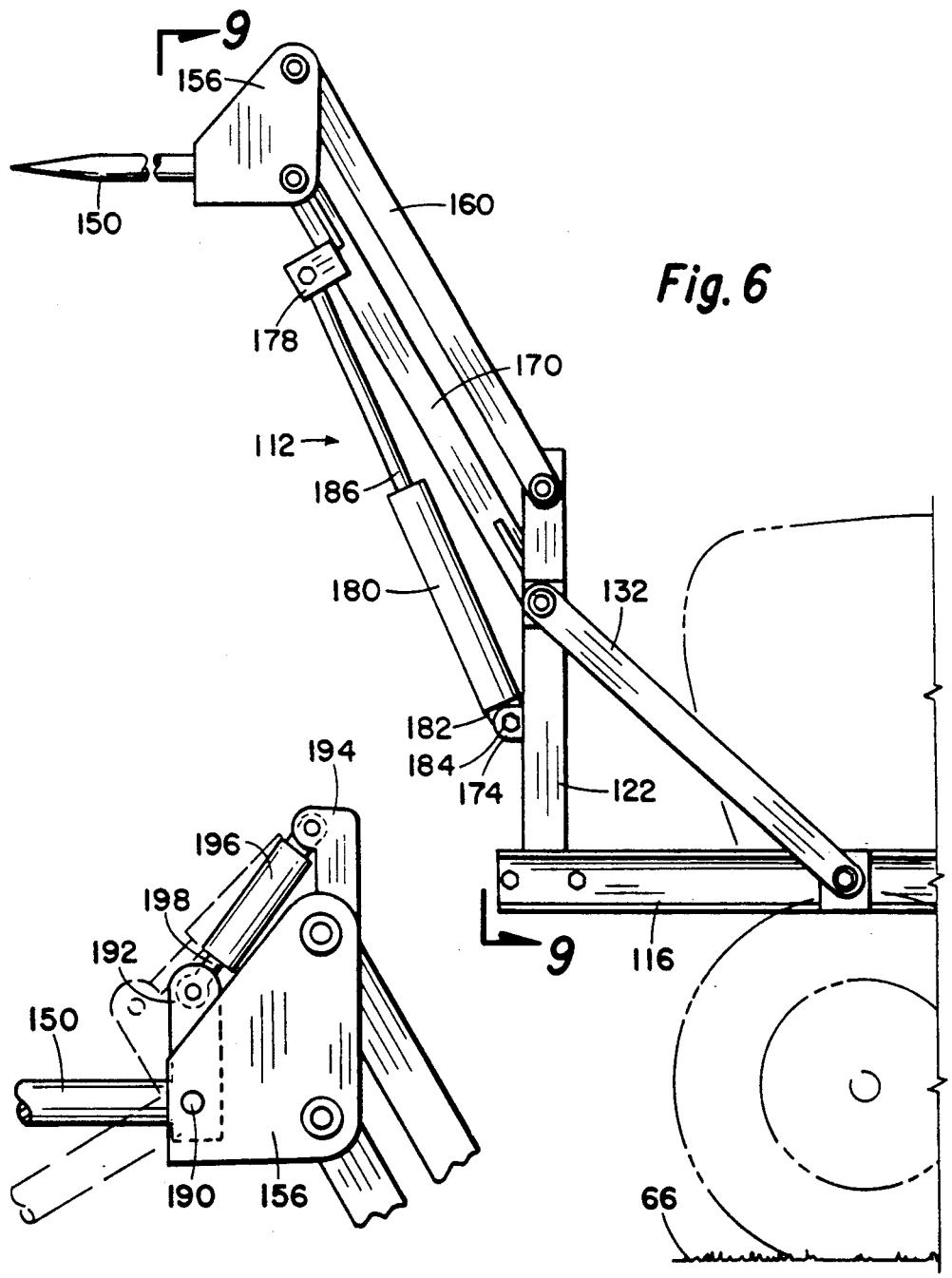

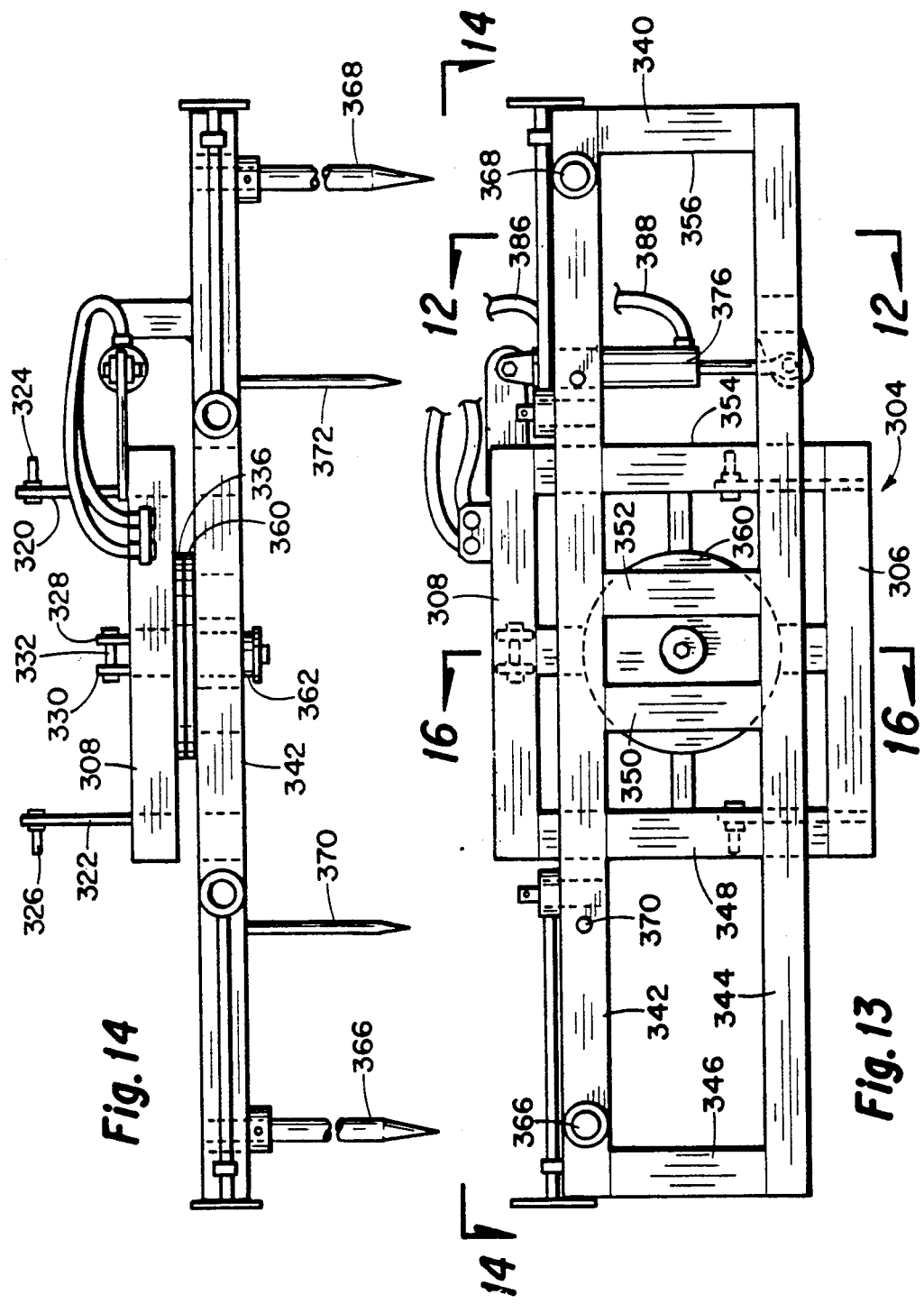

BALE LIFTER AND MOVER

BACKGROUND OF THE INVENTION

1. Field of the Invention

The present invention relates to a device for lifting and/or moving bales of hay, preferably round bales of hay. More particularly, this invention relates to a device which can be attached to an existing vehicle to convert the latter into a bale lifter and/or mover.

2. The Prior Art

At the present time, farmers generally use forklifts and front-end loaders to lift and move round bales of hay. However, the front-end loader and/or forklift each constitutes an extra piece of equipment over and above the tractor which the farmer already has. The present invention constitutes an add-on or attachment to the tractor thereby obviating the need to buy or rent a front-end loader or forklift.

A preliminary search was conducted on the above invention and the following U.S. Patents were uncovered in the search:

| Inventor | U.S. Pat. No. | Issue date |
| --- | --- | --- |
| Martin | 3,934,726 | January 27, 1976 |
| Cox | 4,099,629 | July 11, 1978 |
| Jones et al. | 4,120,405 | October 17, 1978 |
| Lynch | 4,288,191 | September 8, 1981 |
| Buss | 4,256,426 | March 17, 1981 |
| Barton et al. | 4,299,522 | November 10, 1981 |
| Lynch | 4,674,786 | June 23, 1987 |
| Yilit | 4,306,825 | December 22, 1981 |

The Martin Patent discloses a bale carrier having a pair of tines 40 and 42 which are pivotally connected to a pipe 24. The tines will pierce a bale of hay adjacent the bottom and a hook 52 will engage the bale near the top to securely grasp the bale.

The Cox Patent shows a tapered support finger 12 which is adapted to pierce a bale of hay and then pivot upwardly to position the bale of hay in the rear of a truck.

The Jones et al Patent shows a spear-type device for impaling a bale of hay. The device can be attached to a front end loader or to a 3-point hitch.

The earlier Lynch Patent shows an impaling spear 21 which can be pivotally mounted on the rear end of a pickup truck.

The Buss Patent shows an impaling spear which is pivotally mounted on the front end of a tractor.

The Barton et al Patent shows a bale lifting device comprising a pair of parallel tines pivotally mounted to the forward end of a tractor.

The Yilit Patent shows a bale handling apparatus comprising a pair of parallel tines 33 and 34 pivotally mounted on a frame 20. The frame is adapted to be attached to a 3-point hitch on a tractor.

The later Lynch Patent shows a bale handling device having a larger spike 32 and a pair of auxiliary spikes 46, all mounted on a frame 10. The device is designed to be used with a conventional 3-point hitch.

SUMMARY OF THE INVENTION

The present invention relates to a device for lifting and/or moving round bales of hay. In its most simplified form, the present invention involves an impaling device which can be simply attached to the front end of a tractor by means of a pair of arms which project forwardly from the front end of the tractor. These arms support a pivotal structure which includes a spear for impaling a round bale of hay and thereafter tilting the bale up off the ground.

The second embodiment of the present invention includes a device which can also be attached to the forward end of a tractor by means of a pair of arms which are bolted to the forward end of the tractor. This second embodiment, however, involves a spear which can be elevated with respect to the ground while remaining parallel to the ground. An adaptation of this second embodiment involves a modification wherein the spear can be pivoted downwardly after it reaches the highest point of vertical movement for the purpose of dropping a bale of hay.

A third embodiment of the present invention involves a bale lifting device which is similar to the second embodiment but which can be attached to a conventional 3-point hitch on a tractor. This same embodiment can also be attached to the rear of a flatbed trailer.

A still further embodiment of the present invention involves a bale lifting device which is capable of impaling and lifting two bales. This two-bale device includes a square frame which is supported from a tractor by means of a 3-point hitch connection, e.g. the square frame rotatably supports an elongated rectangular frame which has impaling spears at the opposite ends thereof. In operation the farmer will drive the tractor to impale a first bale of hay on the spear at one end of the rectangular frame, thereafter he will lift and pivot the frame so that the spear at the opposite end will now be disposed to pick up a second bale. After picking up the second bale the rectangular frame will be moved to a horizontal position and both spears will be off the ground because the 3-point hitch will be in its uppermost position.

BRIEF DESCRIPTION OF THE DRAWINGS

FIG. 2 is a partial side elevation, on an enlarged scale, of the bale lifter and mover shown in FIG. 1;

FIG. 6 is a side elevation similar to FIG. 5 but showing the device in a vertically extended condition;

FIG. 7 shows a further adaptation of the embodiment shown in FIGS. 5 and 6;

FIG. 13 is a rear view of the structure shown in FIG. 12;

FIG. 14 is a plan view of the structure shown in FIG. 13;

DETAILED DESCRIPTION OF THE PREFERRED EMBODIMENTS

Figure 1:
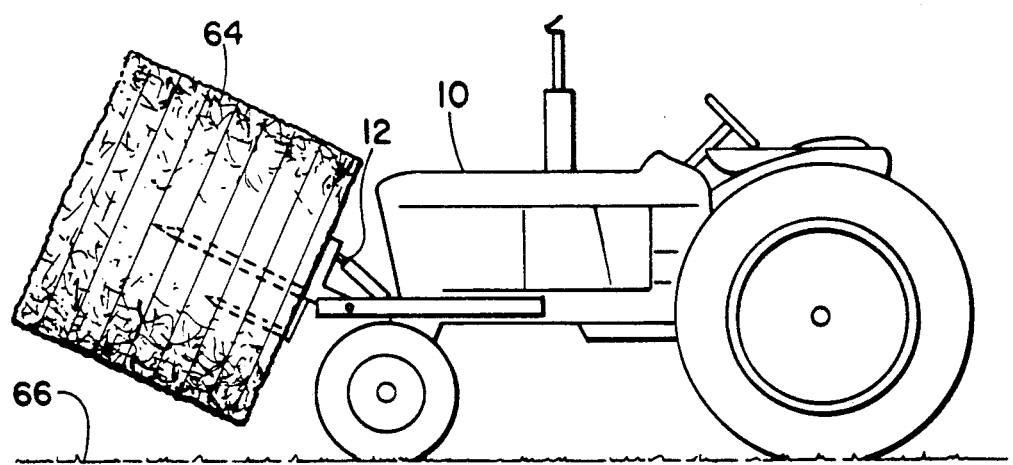
FIG. 1 is a side elevation of a small tractor showing one embodiment of the present invention attached to the front end of a tractor.
Figure 4:
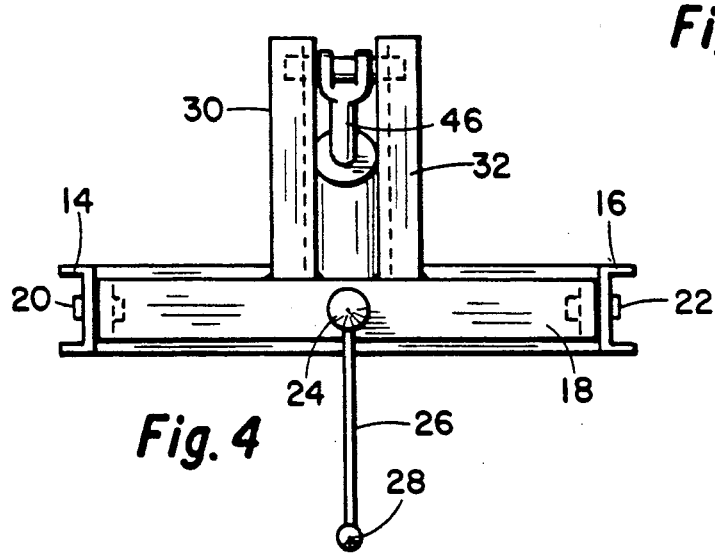
FIG. 4 is a front elevation of the embodiment shown in FIGS. 2 and 3.
Figure 3:
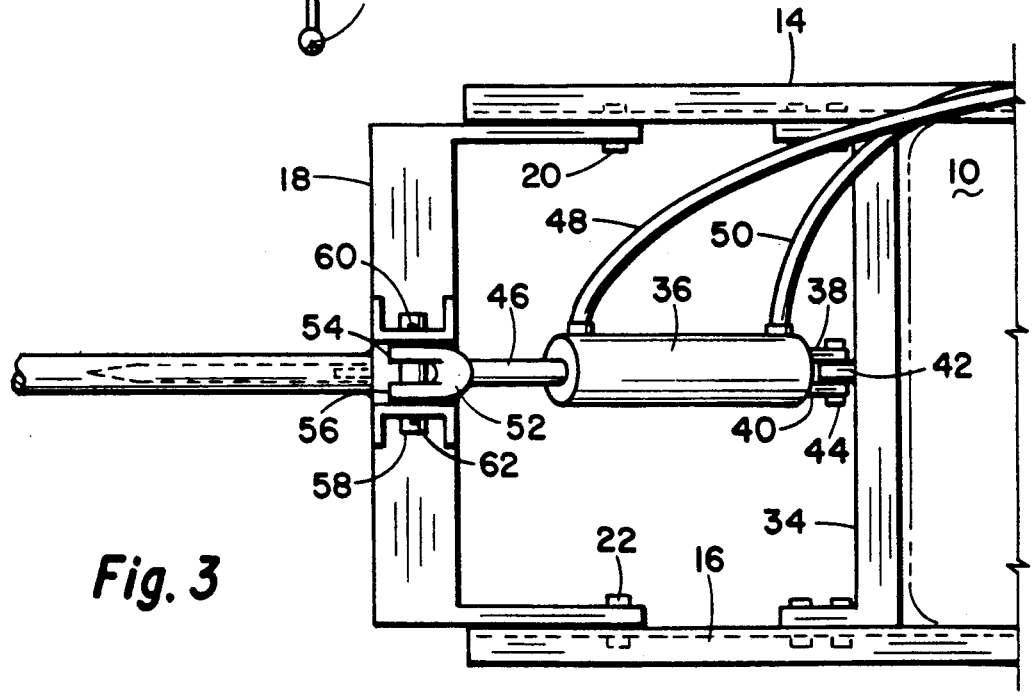
FIG. 3 is a fragmented plan view of the elements shown in FIG. 2.

Referring to drawings in detail, FIG. 1 shows a small tractor 10 to which the bale mover 12 of the present invention is attached. Referring also to FIGS. 2, 3 and 4, the bale mover 12 includes a pair of channels or arms 14 and 16 which are bolted onto the sides of the tractor 10 so that they extend parallel to, and about 18 inches, above the ground, the latter distance being approximately the position of the center of a round bale of hay resting on the ground. At the forward of the arms 14 and 16 is a tiltable yoke 18 which is pivotally attached to the arms 14 and 16 by means of bolts 20 and 22. An impaling spear 24 is attached to the forward end of the yoke 18. A vertical arm 26 extends downward from the rear of the spear 24 and a shorter auxiliary spear 28 extends forwardly below and parallel with the larger spear 24. A pair of channels 30 and 32 extend upwardly from the forward center of the yoke 18 in spaced parallel relation. The lower ends of the channels 30 and 32 are preferably welded to the upper surface of the forward portion of the yoke 18.

A cross member 34 extends between the arms 14 and 16 adjacent the forward end of the tractor 10. The ends of the cross member 34 are preferably bolted to the cross members 14 and 16. A hydraulic cylinder 36 is pivotally connected to the center of the cross member 34; the lower end of the cylinder 36 is provided with a pair of spaced parallel ears 38 and 40. A single ear 42 is attached to and extends forwardly from the center of the cross member 34 so as to fit between the two ears 38 and 40 on the cylinder 36. A rod or bolt 44 is adapted to pass through aligned holes (not shown) in the ears 38, 40 and 42 such that the lower end of the cylinder 36 is pivotally connected to the cross member 34, as stated above.

A piston rod 46 extends outwardly and upwardly from the cylinder 36. The inner end of the piston rod 46 is connected to a conventional piston (not shown) internally mounted within the cylinder 36. A pair of hydraulic hoses 48 and 50 connect with the ends of the cylinder 36 and with a source of hydraulic pressure (not shown). When the line 50 is pressurized, the piston rod 46 will move outwardly from the cylinder 36, and when the line 48 is pressurized, the piston rod 46 will move inwardly in relation to the cylinder 36. The outer end of the piston rod 46 is provided with connecting element 52 which has a pair of parallel fingers 54 and 56. A rod 58 extends through aligned holes in the fingers and the upper ends of the channels 30 and 32. A pair of cotter pins 60 and 62 secure the ends of the rod 58. Thus, the upper end of the piston rod 46 is pivotally connected between the upper ends of the channel members 30 and 32.

When the bale mover 12 is in the solid line position shown in FIG. 2, the tractor can be moved forwardly until the spear 24 impales a bale of hay 64. The tractor is driven forwardly until the rod 24 is totally impaled within the bale at which time the lower spear 28 is also impaled. If pressure is now introduced into the line 48, the piston rod is retracted and the yoke 18 is tilted upwardly to the dotted line position shown in FIG. 2 and as further represented by the position shown in FIG. 1. As shown in FIG. 1, the bale 64 is now elevated off the ground 66 so that the bale can be moved to any convenient location. The purpose of the lower spear 28 is to prevent the bale 26 from rotating on the spear 24.

Figure 5:
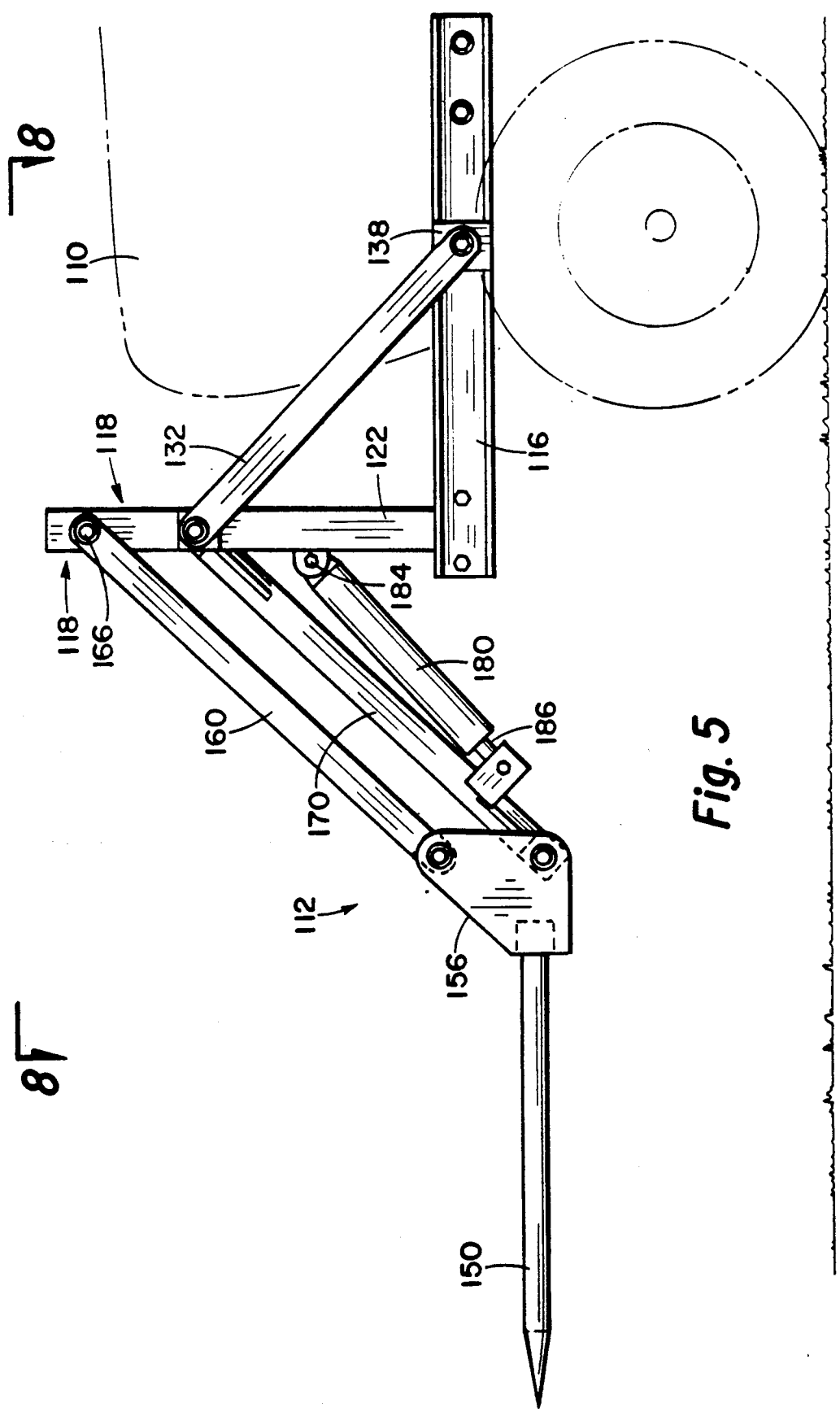
FIG. 5 is a side elevation, similar to FIG. 2, showing another embodiment of the present invention attached to the front end of a somewhat larger tractor.

FIGS. 5 through 9 show another embodiment of the present invention wherein the bale of hay can be elevated from the front end of a tractor by a vertical movement which does not involve tilting. FIG. 5 shows a tractor 110 (somewhat larger than the tractor 10 in FIG. 1) with a bale lifter or mover 112 attached. Referring also to FIGS. 6, 7, 8 and 9, bale mover 112 includes a pair of horizontal arms 114 and 116 which are bolted to the sides of the tractor 110.

Figure 9:
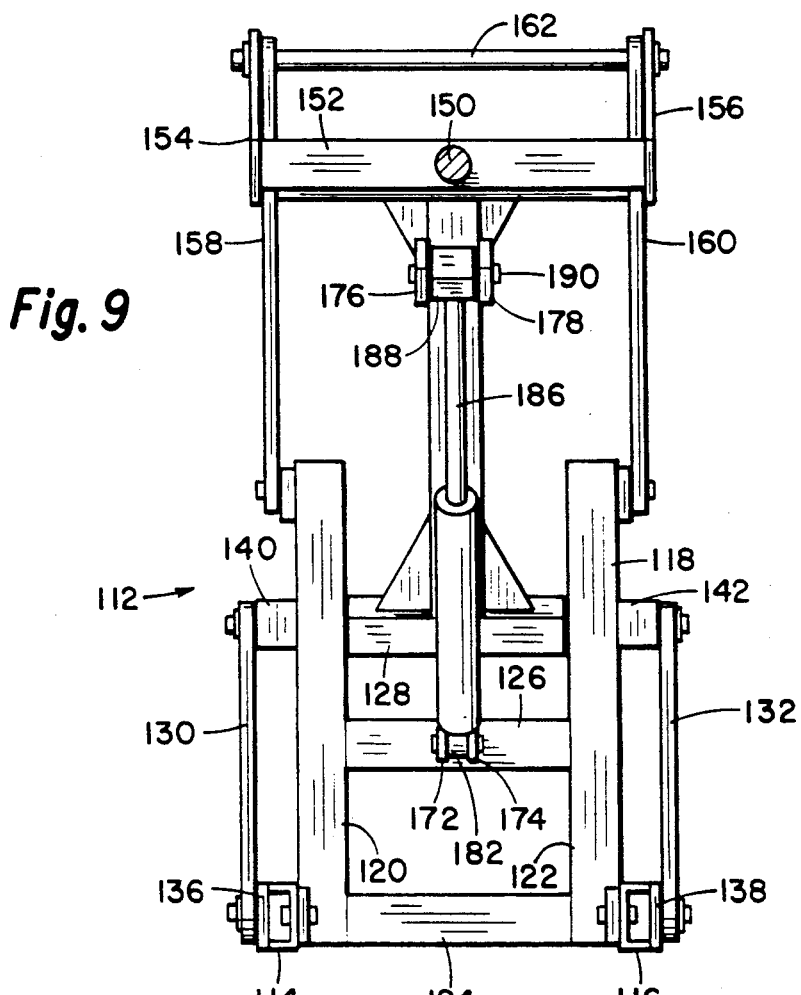
FIG. 9 is a front elevation of the structure shown in FIG. 6.

A vertical support 118 is mounted between the forward end of arms 114 and 116. This vertical support comprises a pair of spaced vertical posts 120 and 122 which are connected together by cross member 124 at the lower ends of these posts. The vertical support 118 is attached at its lower end to arms 114 and 116 by means of bolts which pass through the arms 114 and 116 and through the vertical supports 120 and 122. The vertical support is also provided with two additional cross members 126 (fixed) and 128 (rotatable) which are spaced from each other and spaced above the lower cross member 124, as best shown in FIG. 9.

In order to hold the support 118 in a vertical position, a pair of angled arms or braces 130 and 132 connect from the posts 120, 122 to the horizontal arms 114, 116. More particularly, the lower end of the brace 132 is bolted to a bracket 138 which is attached to the arm 116 while the lower end of the arm 130 is bolted to bracket 136, which is connected to the horizontal brace 114. The upper end of the brace 130 is bolted to a horizontal member 140 which extends out from the side of the vertical post 120; whereas the upper end of the brace 132 is bolted to a horizontal member 142 which extends out from the side of the arm 122.

A spear 150 (similar to the spear 24 of FIG. 1) projects forwardly from the center of a horizontal bar 152. The ends of the bar 152 connect with a pair of horizontally spaced vertical plates 154 and 156. The upper ends of the plates 154 and 156, which are essentially triangular in shape, connect with the upper ends of the vertical posts 120 and 122 by means of arms 158 and 160, respectively. A horizontal rod 162 connects across the top of the triangular plates 154 and 156 and provides a pivotal connection for the lower ends of the arms 158 and 160. The upper end of the arm 158 is pivotally connected to the vertical post 120 at 164. The upper end of the arm 160 is pivotally connected to the vertical post 122 at 166. A cross member 168 extends across the lower rear ends of the triangular plates 154 and 156 and is pivotally connected thereto. The cross member 128, previously described, is pivotally mounted to the vertical arms 120 and 122. An angled strut or arm 170 connects, at its lower end, to the center of the rotatable cross member 168 and, at its upper end, to the center of the rotatable cross member 128.

A pair of spaced ears 172 and 174 extend horizontally forward from the center of the cross member 126 and a pair of spaced ears 176 and 178 extend forwardly and downward from the sides of the arm 170. A hydraulic piston 180 is provided with an ear 182 at its inner end adapted to be received between the ears 172 and 174 on the cross member 126. A bolt 184 which passes through aligned holes (not shown) in the ears provides a pivotal connection between the hydraulic cylinder 180 and the cross member 126. A piston rod 186 extends out of the piston 180.

For the sake of simplicity, there are no hydraulic lines shown connected to the cylinder 180. However, it should be understood that the cylinder 180 and the piston rod 186 are combined into an operative assembly which is essentially the same as that of the cylinder 36 and piston rod 46 which have been previously described in relation to FIGS. 1 through 4.

The upper end of the piston rod 186 connects with a block 188 which is received between the two ears 176 and 178. A pin 190 passes through aligned holes (not shown) in ears 176 and 178 and in the block 188 to provide a pivotal connection between the upper end of the piston rod 186 and the arm 170. When the piston rod 186 is in its retracted position, as shown in FIG. 5, the spear 150 will be relatively close to ground level (similar to the position of the spear 14 in FIG. 2) such that the tractor 110 ca be moved forward to impale the spear 150 in a bale of hay. When hydraulic pressure is supplied to the hydraulic cylinder 180 to extend the piston rod 186 outwardly, the triangular plate 156 will move from the FIG. 5 position to the FIG. 6 position by virtue of the parallel linkage provided by the arms 158, 160 and 170, while the spear 150 maintains a position parallel to the ground 66.

Figure 8:
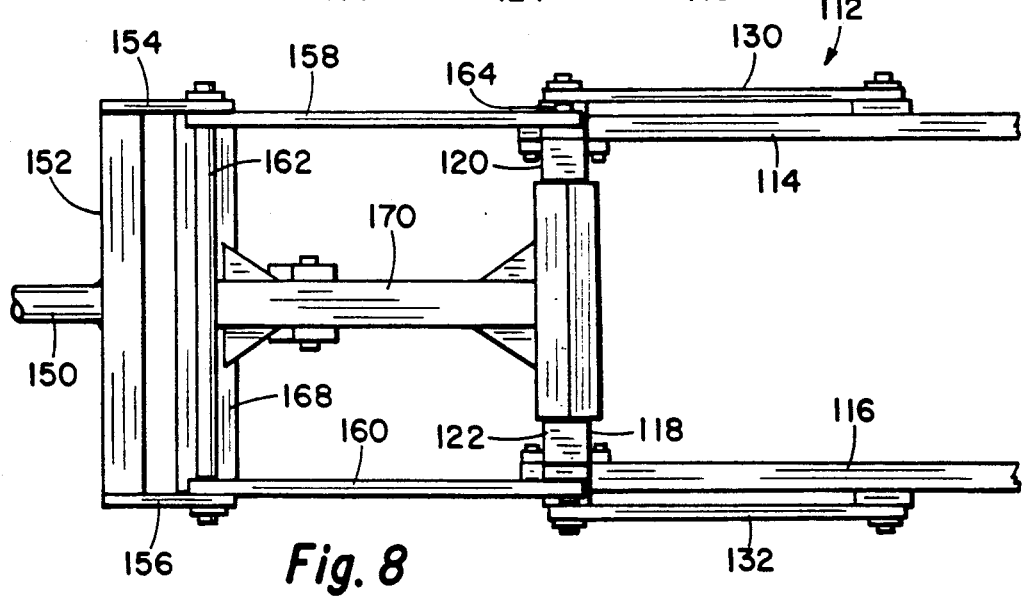
FIG. 8 is a plan view of the structure shown in FIG. 5.

FIG. 7 represents a modification of the bale mover or lifter as shown in FIGS. 6, 8 and 9 wherein the spear 150 is pivotal in relation to the triangular plates 154 and 156 such that the spear can move downward to the dotted line position shown in FIG. 7. Thus, referring to FIG. 6 where the spear 150 is in its highest position of vertical movement, if the bale of hay were impaled on the spear 150 in this FIG. 6 position, then pivoting the spear 150 to the dotted line position in FIG. 7 would cause the bale to slide off the spear 150 to be deposited on the ground or in the back of a pickup, etc.

As far as the details of FIG. 7 are concerned, the cross member 152 would be pivotal or rotatable with respect to the side plates 154 and 156 by means of rod projections at the end of the cross member 152 which project through the side plates 154 and 156. On such rod element which projects outwardly through the side plate 156 is shown at 190. It should be understood that a similar rod projection (not shown) would be provided at the other end of the cross member 152 to project through the other triangular plate 154. An arm 192 would be fixed to the cross member 152 for movement therewith. A bracket 194 would be attached to the upper end of the triangular plate 156 in a fixed position with respect thereto. A small hydraulic cylinder 196 connects to the bracket 194 and a piston rod 198 which extends outwardly from the cylinder is pivotally connected to the arm 192. Thus, when the cylinder 196 is pressurized to move the rod 198 outwardly therefrom, the arm 192 pivots in a counterclockwise direction (in relation to FIG. 7) so as to rotate the cross member 156 and move the spear 150 to the dotted line position shown in FIG. 7.

Figure 10:
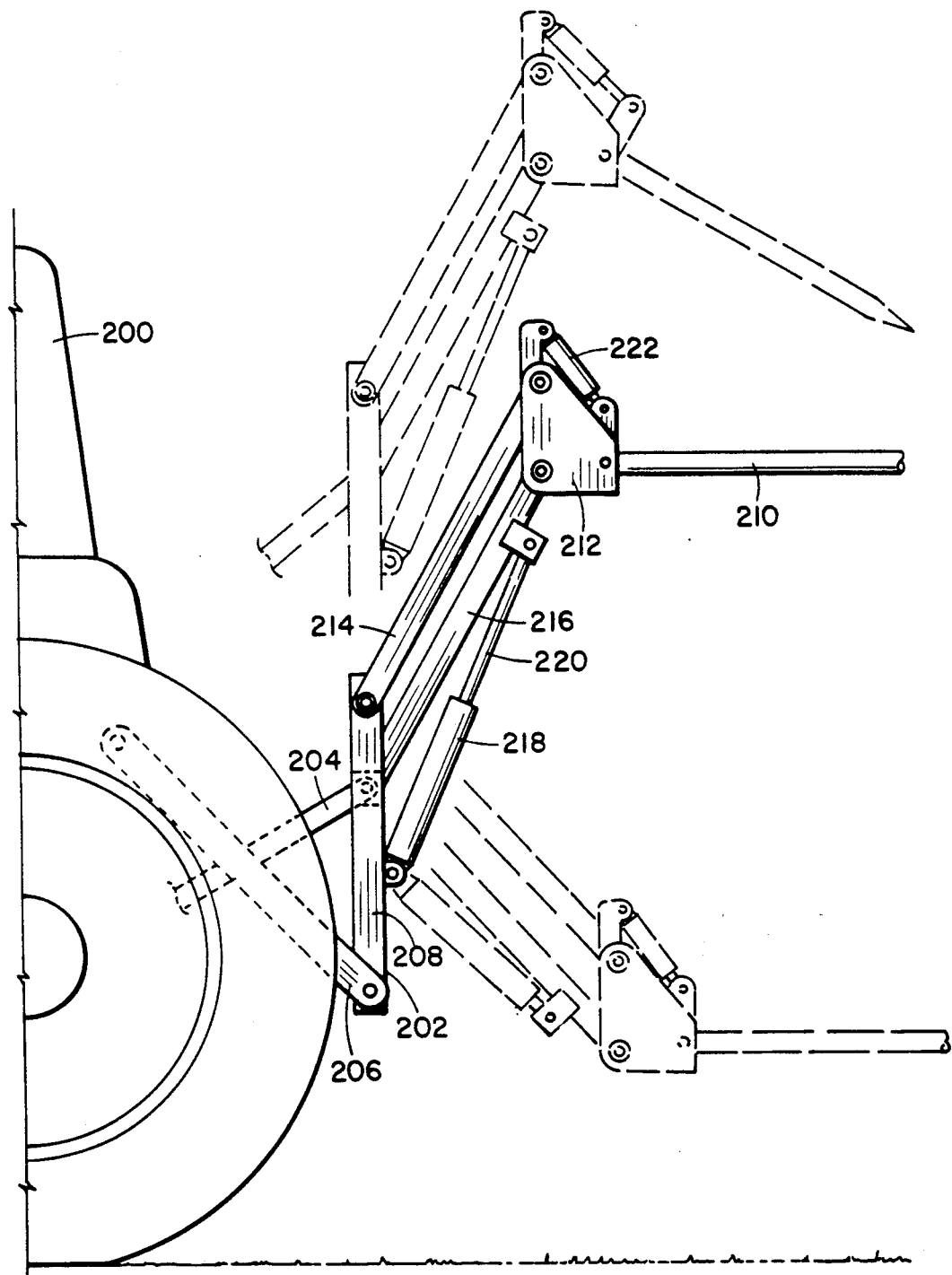
FIG. 10 is a side elevation of the third embodiment of the present invention showing the same attached to a 3-point hitch on the rear of a tractor.

FIG. 10 represents a modification where the bale lifting mechanism of the present invention is incorporated into a tractor having a conventional 3-point hitch. FIG. 10 shows the rear end of a tractor 200 to which the bale lifter 202 of the present invention is connected. As indicated heretofore, the tractor of the type involved in this embodiment is one having a conventional 3-point hitch. In this regard, FIG. 10 shows two linkages 204 and 206 which are part of the 3-point hitch. The bale lifter 202 shown in FIG. 10 is essentially the same in all respects as that which is shown in FIGS. 5 through 9 including the FIG. 7 modification.

Thus, the vertical support 208 corresponds with the vertical support 118 described in FIGS. 5 through 9. The spear 210 corresponds with the spear 150 and the triangular plate 212 corresponds with triangular plate 156. The links 214 and 216 correspond with links 160 and 170. The hydraulic cylinder 218 and the piston rod 220 correspond with the cylinder 180 and the piston rod 186, respectively, previously described. The auxiliary hydraulic cylinder 222 corresponds with the cylinder 196 shown in FIG. 7.

Therefore, the bale lifting device 202 shown in solid lines in FIG. 10 corresponds exactly with that described in FIGS. 7 to 9. However, by virtue of the fact that the vertical member 208 of the bale lifting device is attached to the links 204 and 206 of the 3-point hitch, it is possible to further raise the bale lifting device in FIG. 10 to the upper dotted line position shown in this figure. The lower dotted line position represents the normal lowering and lifting of the bale lifting device from the solid line position shown in FIG. 10 in a manner corresponding precisely to the description of FIG. 5 through 9.

Figure 11:
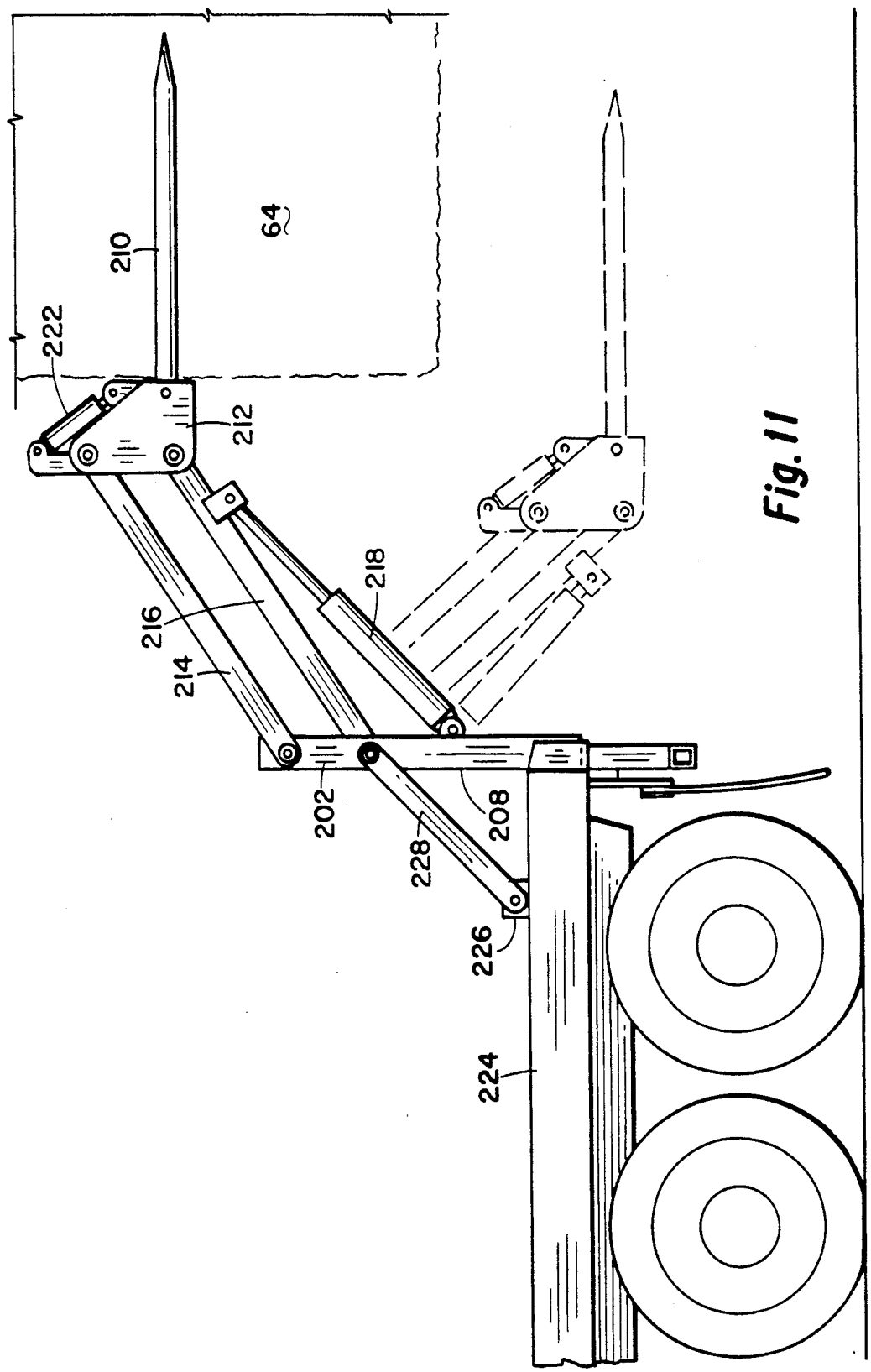
FIG. 11 is a side elevation of another embodiment of the invention, similar to the embodiment shown in FIG. 10, but being attached to the rear of a flatbed trailer.

FIG. 11 represents an embodiment somewhat similar to FIG. 10 wherein the bale lifting device 202 is attached to the rear end of a flatbed truck 224. Instead of attaching the device 202 to a 3-point hitch as shown in FIG. 10, this device 202 is secured to the flatbed truck by attaching the lower end of the vertical post 208 to the back rear edge of the truck 224. The bed of the truck is provided with at least one tab 226 and a brace 228 connects from the tab 226 to the vertical member 208 to hold the vertical member 208 in a fixed vertical position. The numerals on the remaining parts of the lifting device shown in FIG. 11 are the same as those applied to FIG. 10. The spear 210 in FIG. 11 is shown in the solid line position as engaging a bale 64.

Figure 12:
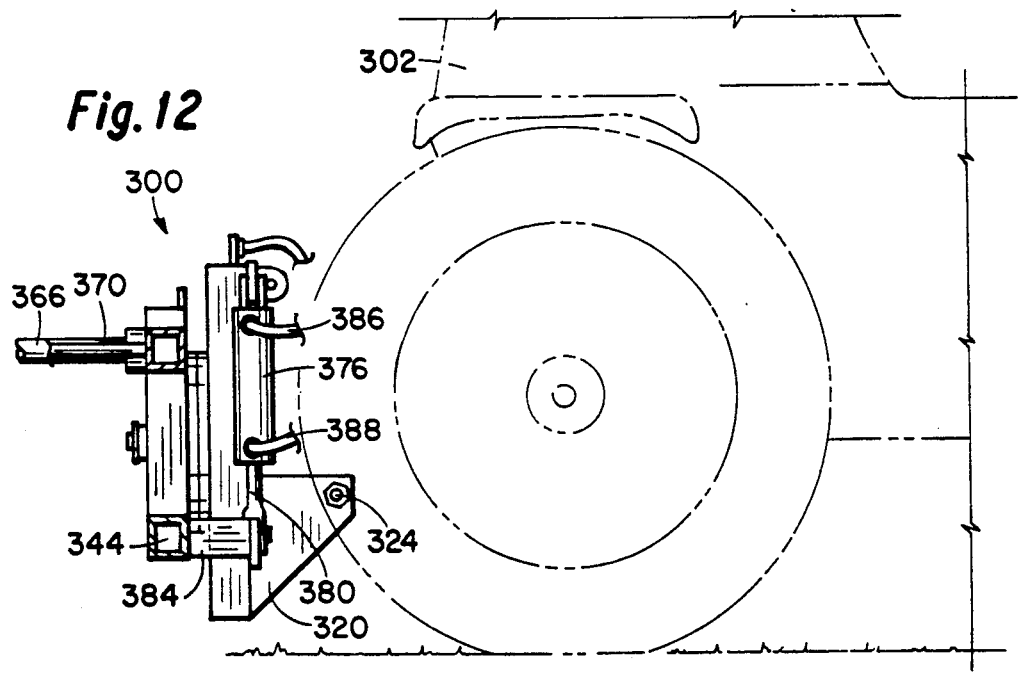
FIG. 12 is a side elevation, with some parts in section, of another embodiment of the present invention which is capable of lifting and moving two bales of hay.
Figure 15:
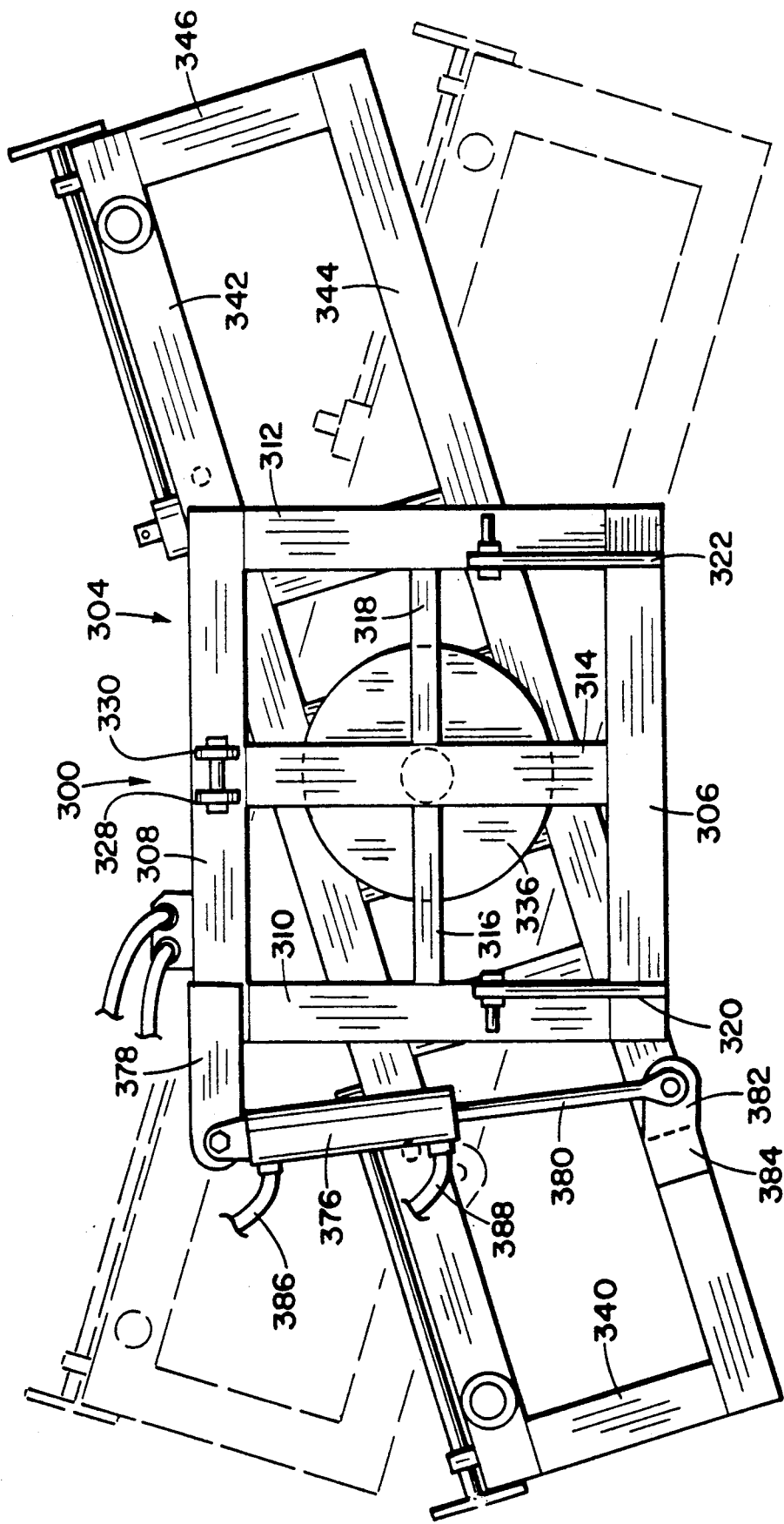
FIG. 15 is a view taken from the opposite side of FIG. 13 (looking from the tractor side) illustrating the tilting feature of all of the frame components.

Another modification of the present invention is shown in FIGS. 12 through 16. In these figures a bale lifting device is provided which is capable of lifting two bales in side-by-side arrangement as will be indicated hereinafter. FIG. 12 shows a bale lifting device 300 associated with a rear end of a tractor 302 having thereon a three-point hitch (not shown).

The bale lifting device 300 consists of an essentially square frame 304 which includes a lower horizontal frame member 306, an upper horizontal frame member 308, a pair of side horizontal frame members 310 and 312 connecting at their upper and lower ends with the horizontal frame members 308 and 306. A central vertical cross member 314 is also provided as well as a pair of shorter narrower horizontal cross members 316 and 318 extending from the sides of the vertical members 310 and 312 to the center cross member 314.

Figure 16:
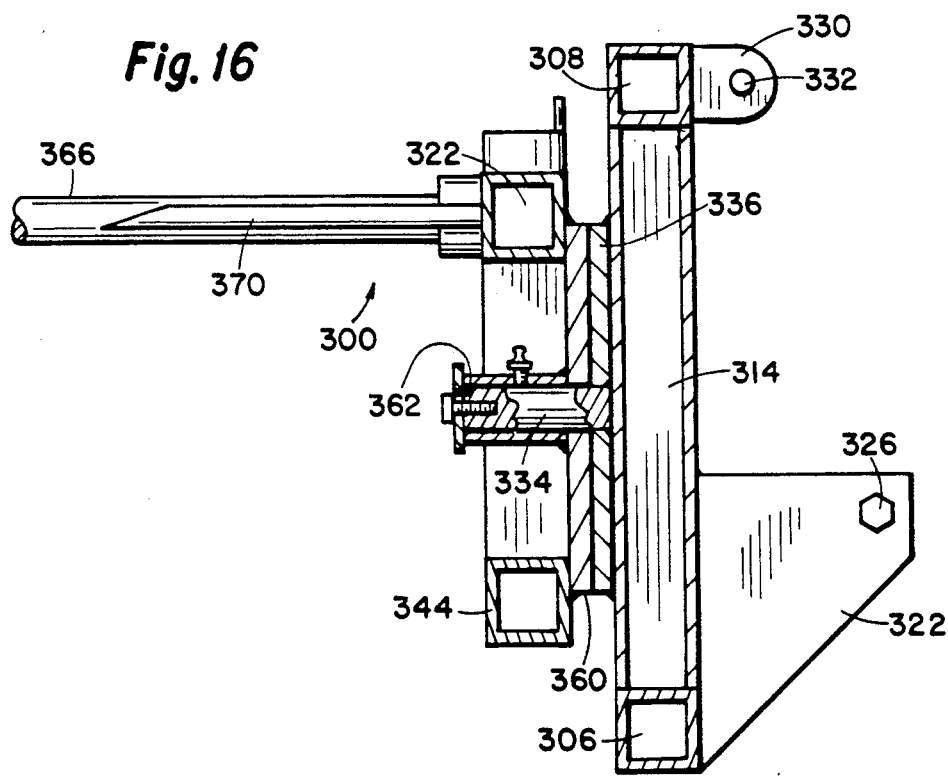
FIG. 16 is a sectional view, on an enlarged scale, taken along section line 16—16 of FIG. 13.

A pair of vertical plates 320 and 322 extend forwardly (toward the truck 302) for the purpose of attachment to the three-point hitch. The plates 320 and 322, as best shown in FIGS. 12 and 16, are essentially triangular in shape and are provided with bolts 324 and 326 at the upper forward ends of these triangular plates. The bolts 324 and 326 permit attachment to the lower links such as links 206 of the three-point hitch shown in FIG. 10.

The upper horizontal member 308 of the frame 304 is provided with a pair of parallel and forwardly projecting ears 328 and 330. A pin 332 which passes through aligned holes in the ear 328 and 330 permits attachment of the upper portion of the frame structure to the other link 204 of the three-point hitch shown in FIG. 10. A horizontal shaft 334 extends rearward from the center of the vertical posts 314 as best shown in FIG. 16. A circular bearing plate 336 is attached to the square frame 304 by welding the same to the central vertical member 314 and cross members 316 and 318.

A horizontally elongated rectangular frame 340 is rotatably connected to the square frame 304 in the following manner: The frame 340 consists of two long horizontal frame members 342 and 344 and a plurality of short vertical frame members 346, 348, 350, 352, 354 and 356. The vertical frame members 350 and 352 are closest to the center of the elongated rectangular frame 340. A bearing plate 360 similar to the bearing plate 336 is attached to the elongated frame structure by welding this plate 360 to the forward surface of the elongated rectangular frame structure over the central vertical frame members 350 and 352 and partially on the elongated frame members 342 and 344. The bearing plate 360 has a hole therein which is slightly larger than the diameter of the shaft 334. The plate 360 also supports a sleeve 362 which is received over the end of the shaft 334.

The upper horizontal cross member 342 is provided with a pair large spear 366 and 368 which project rearwardly from elongated rectangular frame 340. A pair of smaller and shorter spears 370 and 372 are also attached to the upper horizontal cross member 342 inboard of the larger spears 366 and 368 and also project rearwardly from the elongated rectangular frame 340. The spears 370 and 372 prevent rotation of the bales which would be impaled on the larger spears 366 and 368 after the bales are lifted off the ground, as will be explained hereinafter.

In order to provide relative pivotal movement between the central square frame 304 and the elongated rectangular frame 340, a hydraulic cylinder 376 is provided. The hydraulic cylinder is attached to the square frame member by means of a horizontally projecting bracket 378 which connects with the upper end of the cylinder 376. The cylinder is provided with an associated piston rod 380 which connects with an internal piston in the same manner described previously in reference to other hydraulic cylinders which are disclosed herein. The lower end of the piston rod is attached to a tab 382 which, in turn, is attached to the forward end of a horizontal leg 384 which extends forwardly from one side of the lower horizontal frame member 344.

The hydraulic piston 376 is provided with a pair of input hydraulic lines 386 and 388 for the purpose of providing hydraulic fluid to the cylinder 376 to operate the same in a manner similar to that described in relation to the other hydraulic cylinders disclosed herein. When pressure is applied to move the piston rod 380 outwardly from the cylinder 376, the elongated horizontal frame will be tilted in a clockwise direction (as it relates to FIG. 15) so that the left side of the frame 340 is in the lower position. Pressurizing the cylinder 376 so that the piston rod 380 is caused to retract will pivot the elongated rectangular frame structure 340 to the opposite and dotted line position shown in FIG. 15.

Bearing in mind that the bale lifting device of FIGS. 12 through 16 is attached tot he back of a tractor having a 3-point hitch, when the operator of the tractor backs the tractor towards a bale of hay, he will do so in such a manner that one or the other of the two elongated spears 366 and 368 will contact the bale (not shown) in as a nearly as close to the center of the bale as possible. If, perchance, the operator is lucky enough that two bales are positioned on the ground representing the distance between 366 and 368, he could, under these circumstances, impale two bales simultaneously. However, it is unlikely that the two bales will be so positioned on the ground, so the operator will impale on bale and then lift it of the ground using the 3-point hitch. He will thereafter actuate the cylinder 376 to elevate the bale just picked up and to lower the opposite end of the elongated frame structure 340 so that it is in position to pick up the second bale of hay. After the second bale is picked up then the frame structure is rotated to a parallel position where both bales are off the ground by virtue of the fact that the 3-point hitch is in its uppermost vertical position.

Whereas the present invention has been disclosed in terms of the specific structure described above, it should be understood that other and further modifications, apart from those shown or suggested herein, may be made within the spirit and scope of this invention.

What is claimed is:

1. A device for lifting and moving a bale of hay and adapted to be connected to the forward end of a tractor comprising a pair of horizontal arms having forward ends and rear ends, the rear ends being connected to the sides of the tractor at the forward end thereof; a vertical support extending upwardly from the forward ends of the horizontal arms; a pair of angled braces connecting from the vertical support to the horizontal arms; the vertical support having a horizontal first cross member located approximately midway of the height of the vertical support member; a second horizontal cross member pivotally mounted on the vertical support above the first cross member; a pair of horizontally spaced vertical plates disposed forward of the vertical support and having upper, lower, forward and rear ends; a horizontal bar extending across the forward ends of the spaced vertical plates; a spear connected to the center of the horizontal bar and projecting forwardly and horizontally therefrom; a pair of spaced parallel links having forward ends and rear ends, the forward ends of the links being connected to the upper ends of the spaced vertical plates and the rear ends of the links being connected to the upper end of links being connected to the upper ends of the spaced vertical plates and the rear ends of the links being connected to the upper end of the vertical support; a third link having a forward end and a rear end, the forward end being connected to the lower end of the spaced vertical plates by means of a third cross member which extends across the lower rear ends of the spaced vertical plates, the rear end of the third link being connected to the second pivotal cross member on the vertical support; the third link being arranged below and parallel with the pair of links; a hydraulic cylinder having a piston rod extending outwardly therefrom, the hydraulic cylinder having a pivotal connection at one end thereof to the first cross member of the horizontal support, the piston rod having an outer end pivotally connected to the third link adjacent its point of connection to the pair of spaced vertical plates.

2. A bale lifting and moving device as set forth in claim 1 wherein the horizontal bar is rotatably mounted along a horizontal axis of rotation between the spaced vertical plates; a first tab is connected to the horizontal bar and a second tab is mounted on one of the spaced vertical plates; the device includes a second hydraulic cylinder having a second piston rod extending outwardly therefrom, the second hydraulic cylinder having a means at one end thereof for pivotally attaching the cylinder to one of the tabs, the second piston rod having a means at an outer end thereof for pivotally attaching the piston rod to the other tab whereby actuation of the second hydraulic cylinder will cause the spear to pivot downwardly.

3. A device for lifting and moving a bale of hay and adapted to be connected to an end of a vehicle comprising a vertical support connected to the end of the vehicle; the vertical support having a horizontal first cross member located approximately midway of the height of the vertical support member; a second horizontal cross member pivotally mounted on the vertical support above the first cross member; a pair of horizontally spaced vertical plates disposed forward of the vertical support and having upper, lower, forward and rear ends; a horizontal bar extending across the forward ends of the spaced vertical plates; a spear connected to the center of the horizontal bar and projecting the forwardly and horizontally therefrom; a pair of spaced parallel links having forward ends and rear ends, the forward ends of the links being connected to the upper ends of the spaced vertical plates and the rear ends of the links being connected to the upper end of the vertical support; a third link having a forward end and a rear end, the forward end being connected to the lower end of the spaced vertical plates by means of a third cross member which extends across the lower rear ends of the spaced vertical plates, the rear end of the third link being connected to the second pivotal cross member on the vertical support; the third link being arranged below and parallel with the pair of links; a hydraulic cylinder having a piston rod extending outwardly therefrom, the hydraulic cylinder having a pivotal connection at one end thereof to the first cross member of the horizontal support, the piston rod having an outer end pivotally connected to the third link adjacent its point of connection to the pair of spaced vertical plates.

4. A bale lifting and moving device as set forth in claim 3 wherein the horizontal bar is rotatably mounted about a horizontal axis of rotation between the spaced vertical plates; a first tab is connected to the horizontal bar and a second tab is mounted on one of the spaced vertical plates; the device includes a second hydraulic cylinder having a second piston rod extending outwardly therefrom the second hydraulic cylinder having a means at one end thereof for pivotally attaching the cylinder to one of the tabs, the second piston rod having a means at an outer end thereof for pivotally attaching the piston rod to the other tab whereby actuation of the second hydraulic cylinder will cause the spear to pivot downwardly.

5. A bale lifting and moving device as set forth in claim 3 wherein the vehicle is a tractor having a conventional three-point hitch at the end thereof and the vertical support is connected to the three-point hitch.

6. A bale lifting and moving device as set forth in claim 3 wherein the vehicle is a flatbed truck having a rear end and wherein the vertical support is connected to the rear end of the truck.

* * * * *